United States Patent
Aurand (10) Patent No.: US 10,046,874 B2
(45) Date of Patent: Aug. 14, 2018

(54) SEALING SYSTEM AND METHOD FOR GUSSETED AND ZIPPERED BAGS

(71) Applicant: William G. Aurand, Cumming, GA (US)

(72) Inventor: William G. Aurand, Cumming, GA (US)

(73) Assignee: Sonics & Materials, Inc., Newtown, CT (US)

( * ) Notice: Subject to any disclaimer, the term of this patent is extended or adjusted under 35 U.S.C. 154(b) by 0 days.

(21) Appl. No.: 15/363,799

(22) Filed: Nov. 29, 2016

(65) Prior Publication Data

US 2017/0152064 A1    Jun. 1, 2017

Related U.S. Application Data

(60) Provisional application No. 62/260,893, filed on Nov. 30, 2015.

(51) Int. Cl.
| | | |
|---|---|---|
| *B32B 37/00* | (2006.01) | |
| *B65B 9/12* | (2006.01) | |
| *B65B 51/22* | (2006.01) | |
| *B29C 65/08* | (2006.01) | |
| *B29C 65/74* | (2006.01) | |
| *B29C 65/00* | (2006.01) | |
| *B29L 31/00* | (2006.01) | |

(52) U.S. Cl.
CPC .............. *B65B 9/12* (2013.01); *B29C 65/087* (2013.01); *B29C 65/745* (2013.01); *B29C 66/43* (2013.01); *B65B 51/22* (2013.01); *B29L 2031/7128* (2013.01)

(58) Field of Classification Search
CPC ..... B29C 65/08; B29C 65/087; B29C 65/745; B29C 66/43; B65B 9/12; B65B 51/225
USPC ........................................................ 156/73.1
See application file for complete search history.

(56) References Cited

U.S. PATENT DOCUMENTS

| | | | |
|---|---|---|---|
| 5,067,302 A | 11/1991 | Boeckmann | |
| 5,564,255 A | 10/1996 | Giacomelli | |
| 6,379,483 B1 | 4/2002 | Eriksson | |
| 6,881,287 B2 * | 4/2005 | Yasuhira | B29C 65/08 |
| | | | 156/308.4 |
| 8,950,458 B2 | 2/2015 | Patrikios et al. | |
| 2002/0166617 A1 | 11/2002 | Molander et al. | |
| 2003/0046906 A1 | 3/2003 | Kume et al. | |
| 2003/0217530 A1 | 11/2003 | Tillack et al. | |
| 2007/0017623 A1 * | 1/2007 | Wild | B29C 65/08 |
| | | | 156/73.1 |
| 2008/0173694 A1 | 7/2008 | Wild et al. | |
| 2012/0090283 A1 | 4/2012 | Ippers et al. | |
| 2012/0097339 A1 | 4/2012 | Hull | |
| 2014/0033653 A1 | 2/2014 | Cham et al. | |

* cited by examiner

*Primary Examiner* — James Sells
(74) *Attorney, Agent, or Firm* — Forge IP, PLLC (57) ABSTRACT

An ultrasonic sealing tool including an anvil with a sealing surface, a horn with a sealing surface facing the sealing surface of the anvil, the sealing surface of the anvil including a plurality of beads including a first bead having a first height and at least one second bead having a second height, the second height being less than the first height, the ultrasonic sealing tool delivering ultrasonic vibrations via at least one of the anvil and the horn to create a closure seal in a work piece positioned between the anvil and the horn, the closure seal including a first seal created by the first bead and at least one second seal created by the at least one second bead, the first seal having a weld depth greater than a weld depth of the at least one second seal.

21 Claims, 8 Drawing Sheets

SEALING SYSTEM AND METHOD FOR GUSSETED AND ZIPPERED BAGS

FIELD OF THE INVENTION

The present invention relates generally to ultrasonic sealing technology, and more specifically, relates to gusseted and zippered bags, and systems and methods for making such gusseted bags employing ultrasonic sealing technology.

BACKGROUND OF THE INVENTION

Gusseted bags have become very popular in the packaging industry. They are used extensively in the packaging of frozen foods as well as for coffee and cereal bags. Gusseted bags allow for expansion and can hold bulkier contents as compared to common pillow bags. However, this type of bag is notoriously difficult to seal. The difficulty lies in sealing across the multiple variations of layers that are unavoidable in creating a gusset.

The ends of a gusseted bag have several areas of folded material which forms the gussets. There may be areas with four layers of material on the outer edges, areas with two layers of material inboard thereof, and another area with four layers of material in the center of the gusset, resulting in a 4-2-4-2-4 layer end. While these folds are important to form the gussets, they create leak points at the transitions between the different areas of thickness. Bags with an integrated zippers create similar problems and often require a separate process to crush and seal the ends of the zipper.

By comparison, a pillow bag has relative uniformity with only two layers across a majority of the seal. In a pillow bag, a small four layer section resulting from the back fin seal is an insignificant percentage of the total cross seal. Pillow bags can be easily sealed using a variety of sealing technologies.

Heat is currently the preferred technology for gusseted cross seals. While creating a hermetic seal is unreliable with heat, the strength of the seal is good due to its wide width. Typical heat seal jaws produce cross seals that hold approximately 8" Hg to 10" Hg vacuum before leaking on a common coffee pouch.

Custom contour tapered seal anvils have been tried with heat, offering an improvement in seal quality. The idea of the contour is to accommodate the 4-2-4-2-4 layer variation of a gusseted bag by incorporating a corresponding height variation into the seal jaws. One company that specializes in this type of sealing tools reports sealing coffee bags with contoured seal anvil design produced seals holds an average of 16.1" Hg before leaks occurred. One problem with the contoured/bowed anvil approach, however, is that the taper must be gradual and the location of the gussets and fins drifts from bag to bag in production. Further, there is occasionally a two layer section on the extreme outer edges of the seal that occurs if the gussets do not line up perfectly. Since the tools are contoured away from one another at this point, a leak in this location is almost certain.

The sealing of gusseted bags has been attempted with ultrasonics in the past without success. A hermetic seal can be created with ultrasonics using a traditional single seal bead, but it results in a fragile bond that is unable to withstand real-world abuse. When the seal experiences flexing or bulging from the internal product or a vacuum burst test, the transition point where four layers meets two layers becomes highly stressed and the seal quickly fails. Quite often the film bursts at this transition point, tearing through all layers instead of just creating a small leak path. This transition point failure has been an insurmountable hurdle for ultrasonic sealing of gussets. As a result, it is believed that there are currently no ultrasonic suppliers claiming to offer a solution for sealing gusseted bags.

It therefore desired to address these problems and provide an improved seal and method of sealing.

SUMMARY OF THE INVENTION

Accordingly, it is an object of the present invention to provide seals on gusseted and zippered bags using ultrasonics.

It is a further object of the present invention to provide a seal having a high strength seal on an outer edge of the bag and two or more seals of lower strength inboard of the high strength seal. Since a hermetic seal of relatively low strength can be made with ultrasonics by using extreme compression, the approach of the present invention is to add a feature or features that will improve upon the strength. By adding a secondary and possibly tertiary seal of reduced weld depth, the over-compressed barrier seal can still provide the airtight properties that are needed while the weaker seals keep the package from bulging at the transition points. These weaker, product-side seals secure the bag and protect the barrier seal from the stress of product or vacuum test.

These and other objectives are achieved by providing an ultrasonic sealing tool including an anvil with a sealing surface, a horn with a sealing surface facing the sealing surface of the anvil, the sealing surface of the anvil including a plurality of beads including a first bead having a first height and at least one second bead having a second height, the second height being less than the first height, the ultrasonic sealing tool delivering ultrasonic vibrations via at least one of the anvil and the horn to create a closure seal in a work piece positioned between the anvil and the horn, the closure seal including a first seal created by the first bead and at least one second seal created by the at least one second bead, the first seal having a weld depth greater than a weld depth of the at least one second seal.

The tool may be part of a system including a power supply and a converter connected to one of the anvil or the horn converting electrical impulses from the power supply into mechanical vibrations at ultrasonic frequencies.

In some embodiments, the work piece is a gusseted bag including an end defined by the closure seal and a product-containing portion, wherein the at least one second seal is positioned between the first seal and the product-containing portion of the gusseted bag. Alternatively, the workpiece may be a pouch having a side defined by the closure seal, a product-containing portion, and a top end including an integrated zipper extending through the closure seal, wherein the at least one second seal is positioned between the first seal and the product-containing portion of the pouch. In some embodiments, the closure seal is made of a plurality of layers of a film, wherein the first seal welds all of the plurality of layers and the at least one second seal does not weld all of the plurality of layers.

In some embodiments, the sealing surface of the anvil further includes a curved recess in between each of the plurality of beads such that the sealing surface has a wavy pattern, wherein the sealing surface of the horn has a corresponding wavy pattern. Further, the sealing surfaces of the anvil and the horn may progressively diverge from one other from a first side of the tool to a second side of the tool.

Further provided is an ultrasonic sealing system for gusseted or zippered bags, including an ultrasonic tool including an anvil having upper and lower sealing surfaces and a horn having upper and lower sealing surfaces facing the upper and the lower sealing surfaces of the anvil. Each of the upper and the lower sealing surfaces of the anvil include a plurality of beads including a first bead having a first height and at least one second bead having a second height, the second height being less than the first height. The ultrasonic sealing system delivers ultrasonic vibrations via at least one of the anvil and the horn to simultaneously create closure seals in each of two bags positioned between the anvil and the horn, each of the closure seals including a first seal created by the first bead and at least one second seal created by the at least one second bead, the first seal having a weld depth greater than a weld depth of the at least one second seal.

The system may also include a cutting tool extendible between the upper and lower sealing surfaces of at least one of the anvil and the horn to sever the two bags. The system may also include a power supply and a converter connected to one of the anvil or the horn converting electrical impulses from the power supply into mechanical vibrations at ultrasonic frequencies.

Each of the bags is made of a film with two or more layers of the film in the end and/or side of the bag to be sealed. For example, the ends of each of the bags may include portions with two layers of the film and portions with four layers of the film.

Other objects of the present invention are achieved by a method for sealing a gusseted or zippered bag, comprising the steps of positioning a bag between a sealing surface of an anvil and a sealing surface of a horn, the sealing surface of the anvil including a first bead having a first height and at least one second bead having a second height, the second height being less than the first height, delivering ultrasonic vibrations to the bag via at least one of the anvil and the horn to create a closure seal in the bag, the closure seal including a first seal created by the first bead and at least one second seal created by the at least one second bead, the first seal having a weld depth greater than a weld depth of at least one second seal.

In some embodiments, the bag includes an end defined by the closure seal and a product-containing portion, wherein at least one second seal is positioned between the first seal and the product-containing portion of the bag. For example, the first seal may be adjacent to a distal edge of the end of the bag.

The method may further include a step of actuating a cutting tool to sever the bag from a second bag.

The invention also provides a bag including a first closure seal, a second closure seal, and a product-containing portion there between, each of the first and second closure seals including an ultrasonic seal having a first depth along an outer edge and two or more second ultrasonic seals of second depth, lower than the first depth, inboard of the first seal. Each of the closure seals are comprised of a plurality of layers of a film, wherein the first seal welds all of the plurality of layers and the second seals welds less than all of the plurality of layers. In some embodiments, the bag is a gusseted bag. In other embodiments, the bag is a standup bag with a zippered opening.

Other objects of the invention and its particular features and advantages will become more apparent from consideration of the following drawings and accompanying detailed description.

DETAILED DESCRIPTION OF THE INVENTION

Figure 1:
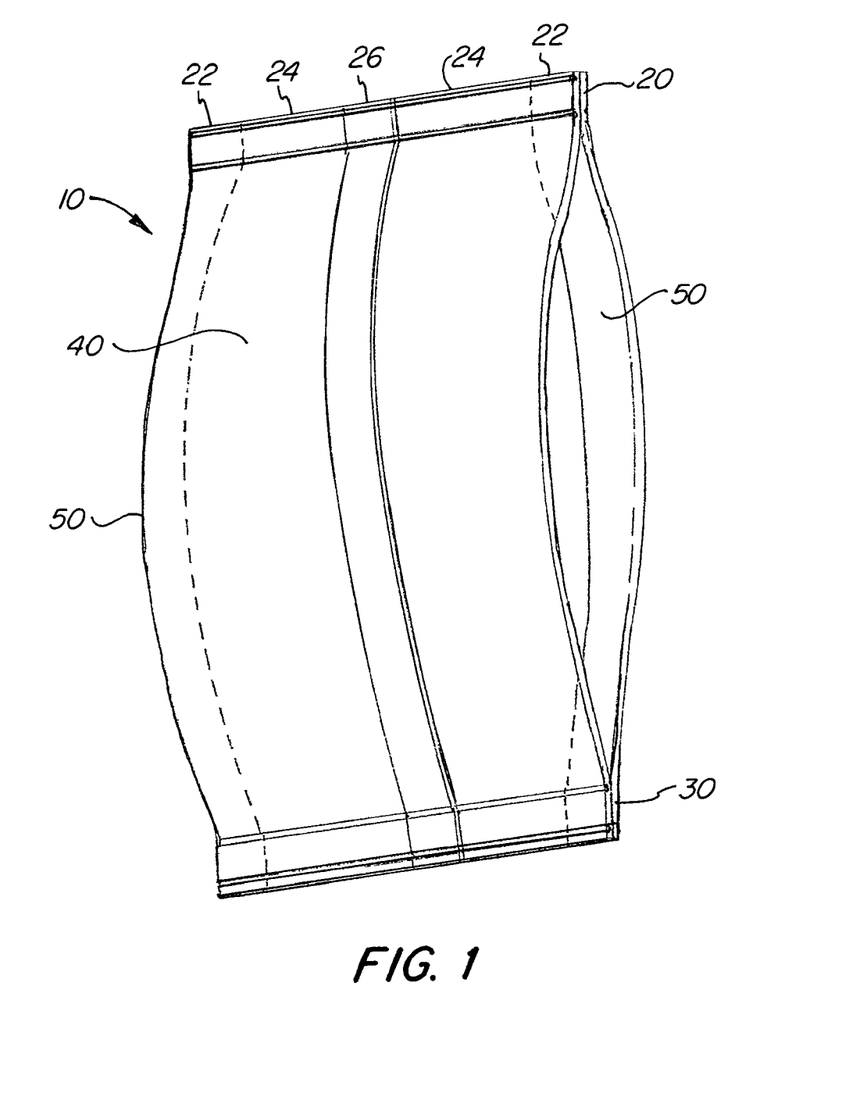
FIG. 1 illustrates a gusseted bag.

FIG. 1 illustrates a gusseted bag 10. The bag 10 is formed out a film, such as a plastic film, and includes gussets 50, closure seals 20/30, and a bag portion 40. Due to the manner in which the bag 10 is constructed, by folding the film, the closure seals 20/30 have portions of varying thicknesses. As shown in the top seal 20, there are portions 22 that have four layers of the film, portions 24 that have two layers of the film, and a portion 26 that has four layers of the film.

Figure 2:
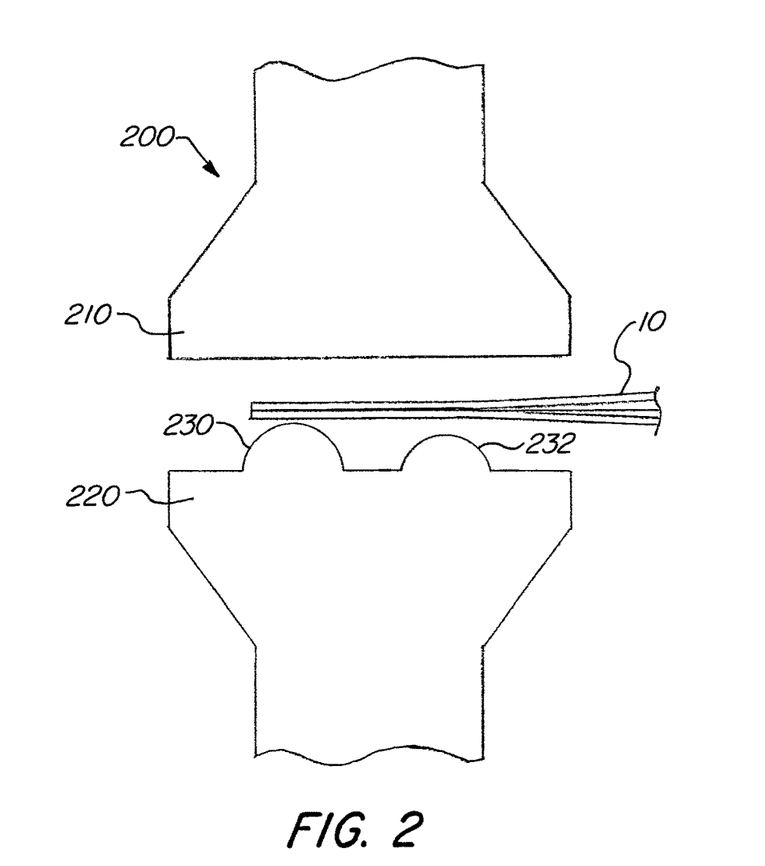
FIG. 2 illustrates a sealing tool for a gusseted bag according to an exemplary embodiment of the present invention.

FIG. 2 illustrates a sealing tool 200 for sealing a work piece, such as a gusseted bag 10, according to an exemplary embodiment of the present invention. The tool 200 includes a horn or sonotrode 210 and an anvil 220. As one skilled in the art will understand, the tool 200 is mounted in an ultrasonic welding machine and the horn 210 (or anvil 220, or both the horn 210 and the anvil 220) is actuated with high-frequency mechanical vibrations generated by a converter (see FIG. 8) connected thereto that converts electrical impulses from a power supply into the mechanical vibrations at ultrasonic frequencies (e.g., 20 kHz or more). See, for example, U.S. Pat. No. 8,950,458, incorporated herein by reference.

A portion of a work piece to be sealed, such as the bag 10, is received between opposing surfaces of the horn 210 and the anvil 220, and the gap between the surfaces is closed or reduced to sandwich the bag 10 by displacing (e.g., manually or automatically) one or both of the horn 210 and anvil 210. The horn 210 and/or the anvil 220 are then vibrated at ultrasonic frequencies to act upon the bag 10 positioned there between and create seals.

The anvil 220 includes two or more seal beads 230/232 with different heights. A first bead 230 creates a barrier seal (i.e., an airtight seal) along a top edge of the bag 10 by providing the deepest of the weld compressions. A second bead 232 creates a protective seal using a reduced weld depth. The height of the first bead 230 is greater than the height of the second seal bead 232. The offset between the beads 230/232 will vary depending on the overall film thickness and seal layer thickness of the bag 10.

Figure 3:
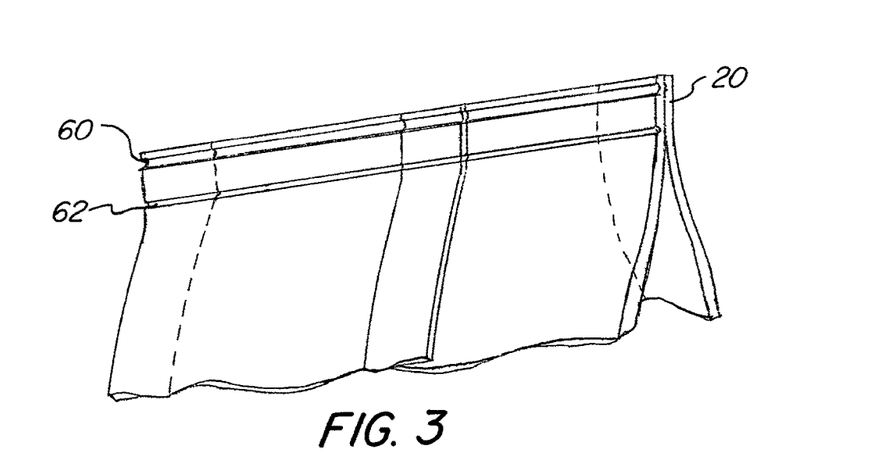
FIG. 3 illustrates a seal of a gusseted bag sealed by the tool shown in FIG. 2.

As shown in FIG. 3, the tool 200 forms a deep barrier seal 60 and at least one shallower protective seal 62. The barrier seal 60 is furthest from the internal product (closest to the end of the bag 10). This substantially differs from known ultrasonic sealing methods. Other ultrasonic multi-bead seals, which are used on pillow bags, create two or more seal beads of equal strength to serve as backups in case one or more of the seals fail.

Figure 4:
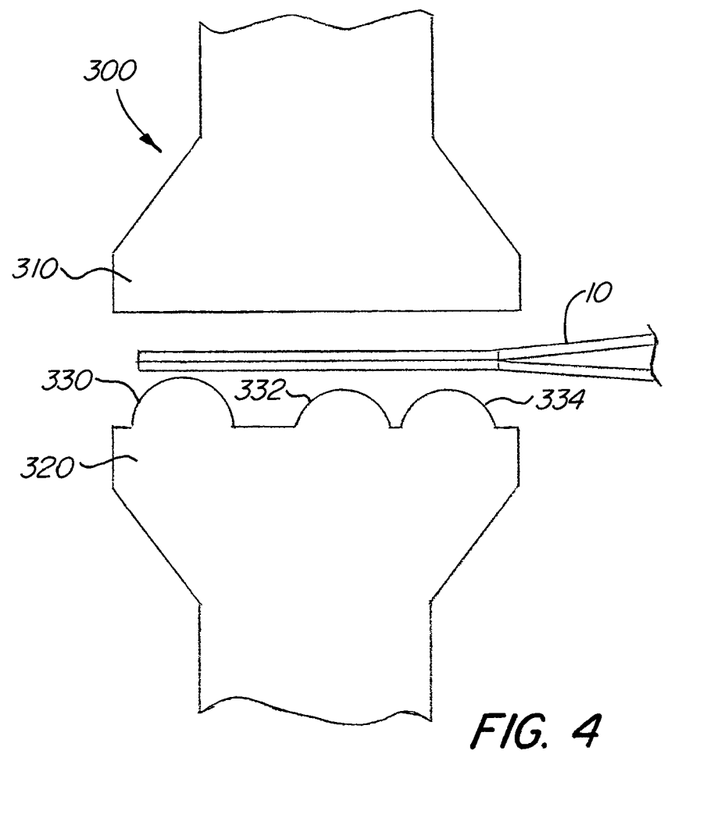
FIG. 4 illustrates a sealing tool for a gusseted bag according to an exemplary embodiment of the present invention.

FIG. 4 shows another tool 300 according to the present invention including a horn 310 and an anvil 320. The anvil 320 includes a first bead 330 and at least two additional beads 332/334. The height of the first bead 330 is greater than the height of each of the additional seal beads 332/334. The tool 300 creates a closure seal 20 shown in FIG. 5 having a barrier seal 60 and two protective seals 62/64.

Figure 5:
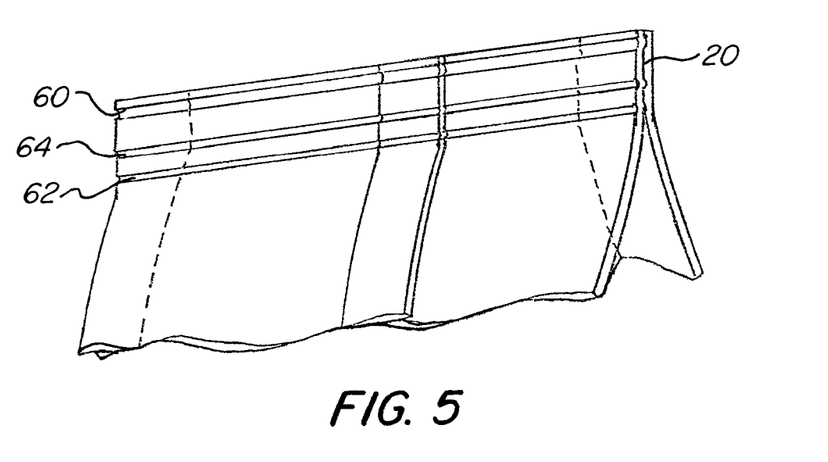
FIG. 5 illustrates a seal of a gusseted bag sealed by the tool shown in FIG. 4.

The protective bonds or seals 62/64, made on the product side of the closure seal 20, are not intended to be hermetic or provide a leak free barrier. These inner bonds 62/64 exist for the specific purpose of reinforcing the barrier seal 60. Creating multiple barrier seals does not accomplish the same result because the transition points closest to the product would still encounter extreme stress that can cause the film to rupture. Thus, with the present invention, the protective seals 62/64 on the product side do not weld all of the film layers at the transition point. This gap in the transition point seal is what dissipates the stress caused when the package bulges.

A recent study sealing coffee bags showed the inventive tooling design produced seals holding an average of 20" Hg before leaks occurred. This is a 25% increase in seal quality over the industry's best alternative, and more than double the industry standard.

Figure 6:
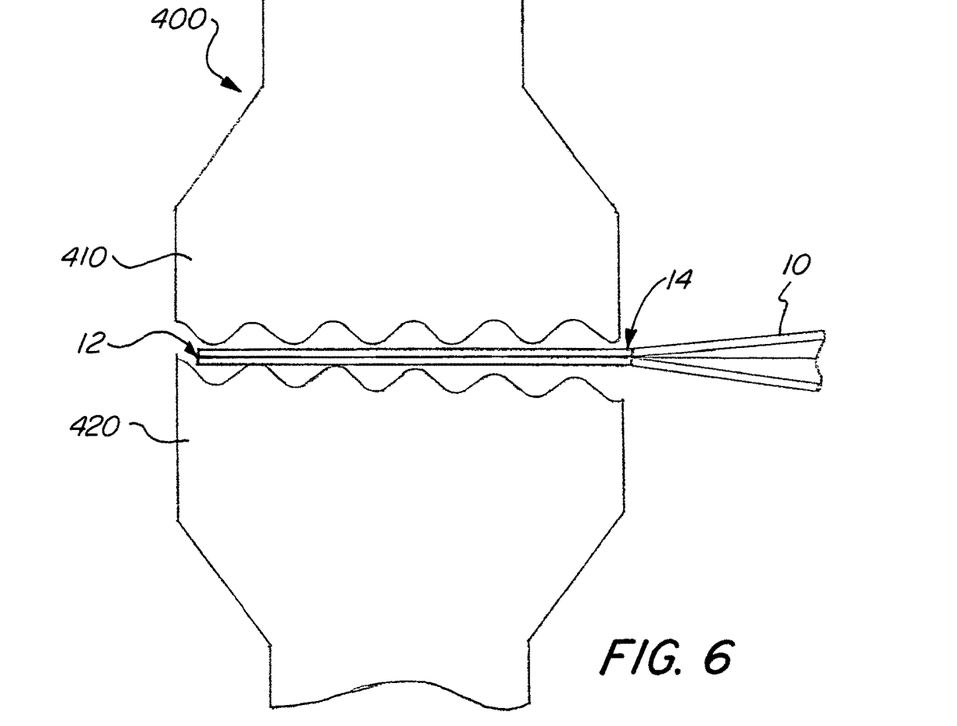
FIG. 6 illustrates a sealing tool for a gusseted bag according to an exemplary embodiment of the present invention.

The present invention may also be implemented through the use of a single wider ultrasonic seal that is tapered, slanted, or of varying depth. The taper in the tools creates a natural wave in the product side edge of the seal due to the variations in film thickness/layers. In particular, FIG. 6 illustrates another such embodiment of a tool 400.

Figure 7:
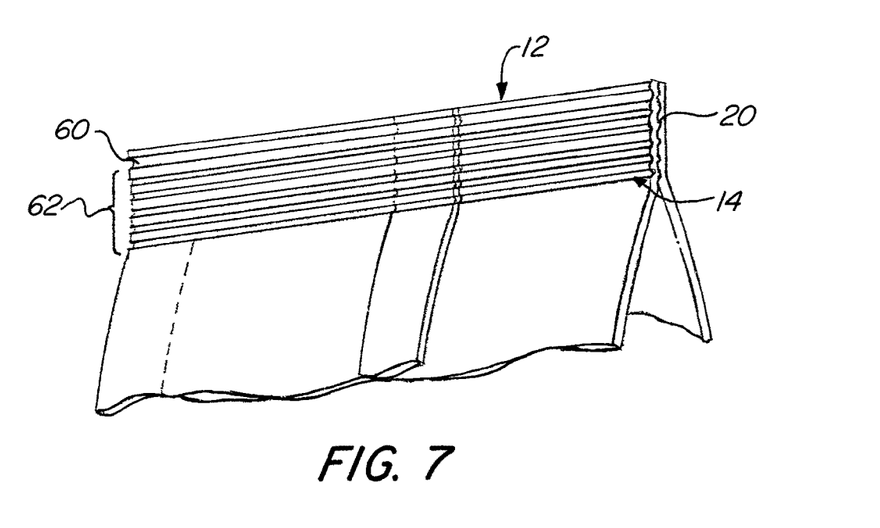
FIG. 7 illustrates a seal of a gusseted bag sealed by the tool shown in FIG. 6.

The tool 400 includes a horn 410 and an anvil 420. The horn 410 and anvil 420 each have a wavy patterned surface with a plurality of peaks and valleys. The peaks on one surface (e.g., 410) at least partially engage into valleys on the opposing surface (e.g., 420), and vice versa. The surfaces of the horn 410 and anvil 420 are also angled with respect to another such that one end, closest to the distal end 12 of the seal 20, closes before and deeper than the other end, closest to the proximal end 14 of the seal 20 the product in the bag 10. Thus, the depth of the weld increases from the proximal end 14 of the seal 20 to the distal end 12 creating a seal 20 of progressive strength and depth. As shown in FIG. 7, the tool 400 creates a barrier seal 60 and a plurality of progressively lesser protective seals 62.

With this embodiment, the primary barrier is still furthest from the product in the bag 10. The protective enhancement comes, not from separate weaker bonds on the product side, but from a gradually weaker seal created by the slanted tools opening up toward the internal product. A non-slanted wide ultrasonic seal in itself would not provide a strength enhancement because the transition points still see the full force of vacuum or internal product. Multiple, progressive depth seal beads as well as a single wide bead, slanted for progressive seal depth, may also be used.

Figure 11:
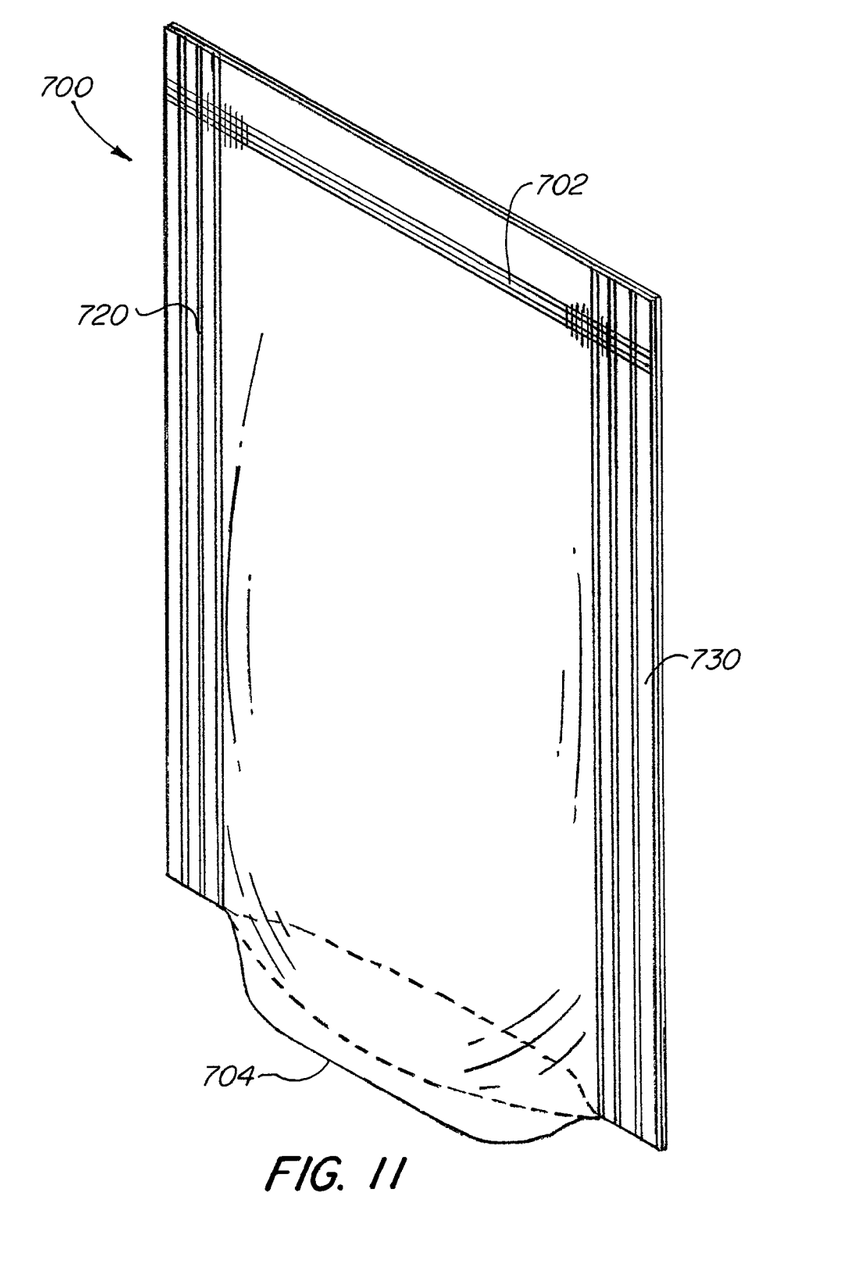
FIG. 11 illustrates a zippered bag according to an exemplary embodiment of the present invention.

This embodiment has shown to provide the additional benefit of simultaneously crushing an integral zipper opening device when used to create side seals on standup pouches or bags (e.g., doy style pouches). Crushing zippers with ultrasonic tools to enhance hermeticity is a common application. However, crushing the zipper while simultaneously creating the side seal has not been possible with ultrasonics prior to the arrival of this technology. FIG. 11 shows a pouch 700 with a zipper 702, a standup bottom 704, and side seals 720/730 formed using the technology of the present invention. Tools (e.g., 400), each with a horn and an anvil, act on each side of the pouch 700 to create the side seals 720/730 and simultaneously crush and seal ends of the zipper 702.

The present invention is particularly advantageous for use in a vertical mode of operation or vertical machine where both top and bottom seals or two side seals are created in a single cycle. This is contrary to horizontal machines in which a single pouch is presented to the welder strictly to close the top. In vertical applications for gusseted bags, the film tube is welded in two distinct areas and then cut between the welds all in a single station. This means that the vertical weld cycle creates the top seal on one bag, while simultaneously creating the bottom seal of the next bag. This technology may however be used in horizontal machinery to enhance the seal performance of gusset side seals on standup pouches.

Figure 8:
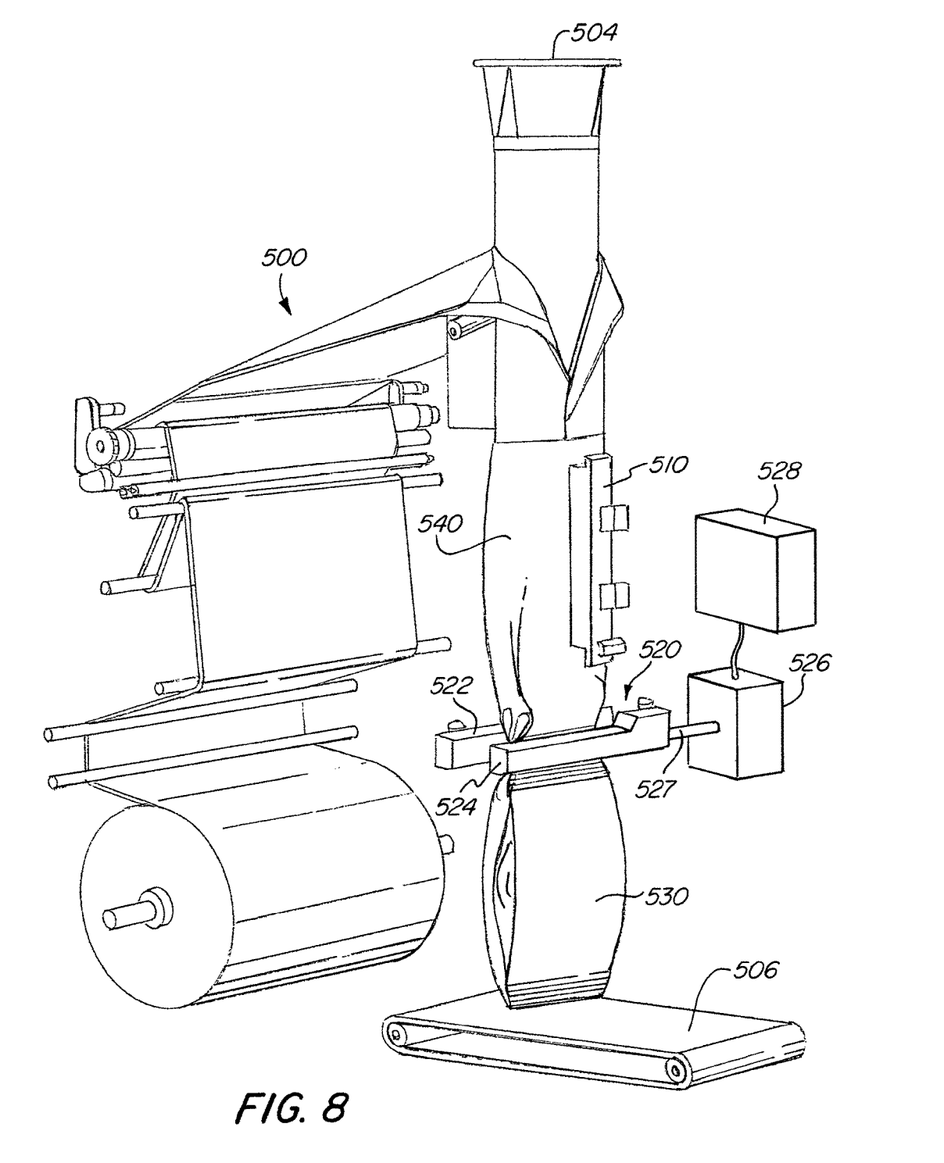
FIG. 8 illustrates an ultrasonic sealing machine according to an exemplary embodiment of the present invention.

FIG. 8 illustrates an exemplary vertical sealing machine 500. The machine 500 includes a roll of material/film 502 and a chute 504 for delivering product into bags. The machine 500 also includes a first ultrasonic tool 510 and a second ultrasonic tool 520. The first ultrasonic tool 510 provides mechanical vibrations to form an ultrasonic side seal along a length of each of the bags 530/540.

The second ultrasonic tool 520 includes a horn assembly 522 and anvil assembly 524 (or vice versa) to form the top and bottom ultrasonic seals on the bags 530/540. At least one of the horn assembly 522 and/or the anvil assembly 524 includes a converter 526 connected thereto that converts electrical impulses from a power supply 528 into mechanical vibrations at ultrasonic frequencies (e.g., 20 kHz or more). In some embodiments, the vibrations are provided to the horn and/or anvil via a booster 527. As illustrated, the tool 520 forms a top seal on a first bag 530 while forming a bottom seal on a second bag 540. After the second bag 540 is filled with product via the chute 504, it passes below the tool 520 to have its top seal formed. Once the bag 530 is full and sealed, it is cut free and transported via a belt 506.

The vertical sealing machine 500 shown in FIG. 8 may similarly be used to seal zipper pouches such as the pouch 700 shown in FIG. 11. However, the pouch 700 passes through the machine 500 sideways so that the tools 510/520 form side seals instead of top and bottom seals and also simultaneously crush and seal opposite ends of the zipper 702.

Figure 9:
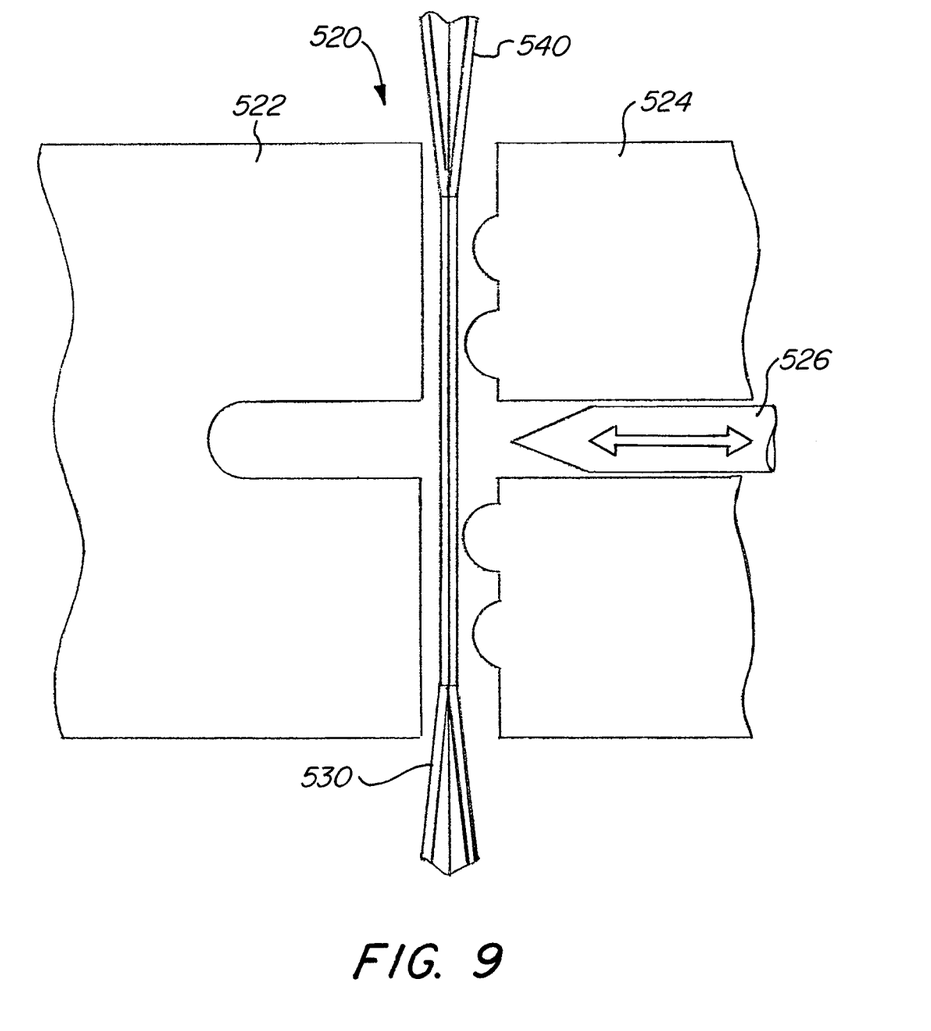
FIG. 9 illustrates a tool for use in the ultrasonic sealing machine of FIG. 8.
Figure 10:
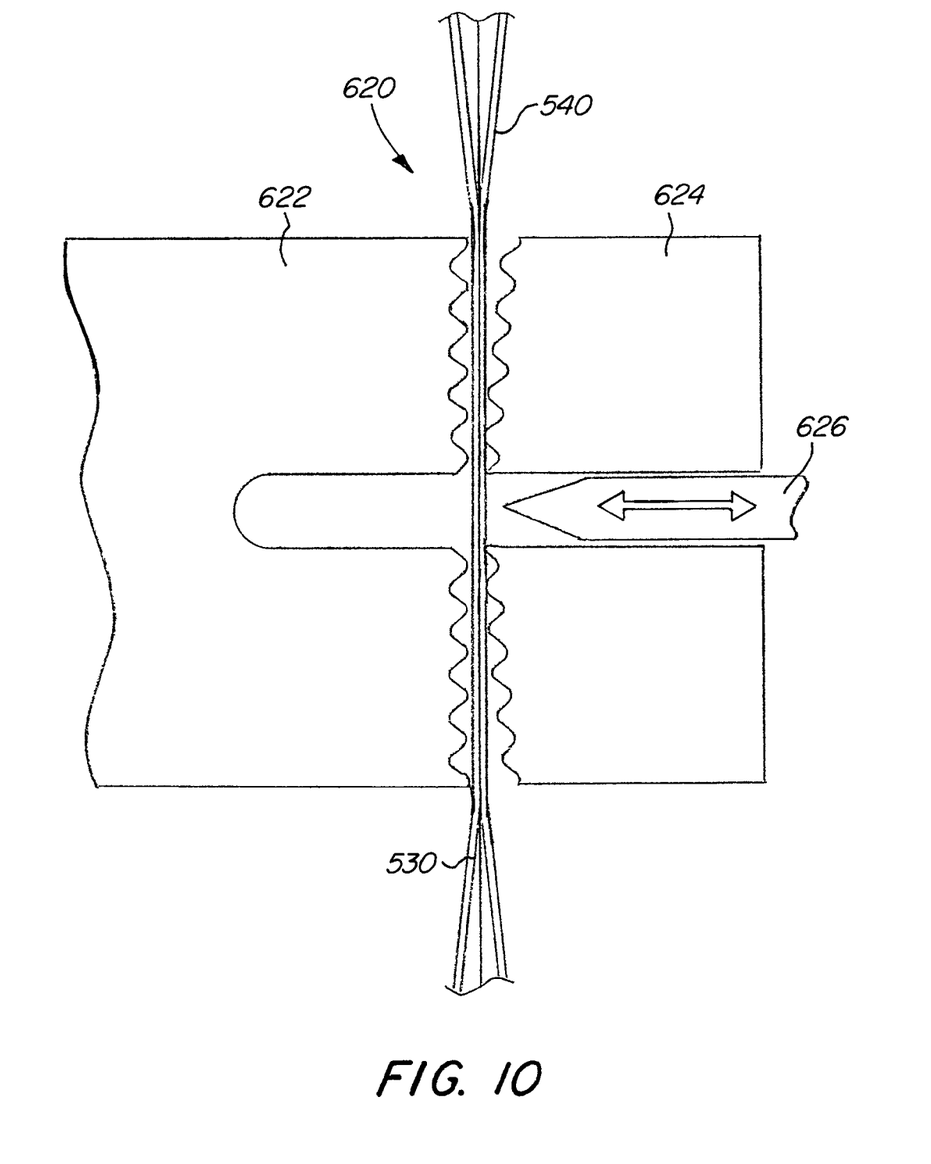
FIG. 10 illustrates another tool for use in the ultrasonic sealing machine of FIG. 8.

An exemplary embodiment of the ultrasonic tool 520 is further illustrated in FIG. 9. The tool 520 includes the horn assembly 522 having a substantially flat surface with an upper portion and a lower portion. The tool 520 further includes the anvil assembly 524 having an upper surface with a plurality of beads to form a bottom seal on the bag 540 and a lower surface with plurality of beads to form a top seal on the bag 530. As the seals are created, or immediately afterwards, a cutting tool or knife 526 is extended between the upper and lower surfaces of the horn 522 and anvil 524 to sever the bag 530 from the bag 540. An alternative embodiment is shown in FIG. 10 in which operates the same way but the tool 620 is provided with a horn assembly 622 and anvil assembly 624 having surfaces with wavy patterns as in FIG. 6.

The systems and tools described herein may be used to perform a method of sealing a gusseted or zippered bag. The method may include positioning a bag between a sealing surface of an anvil and a sealing surface of a horn, the sealing surface of the anvil including a first bead having a first height and at least one second bead having a second height, the second height being less than the first height. In some embodiments, there is another step of closing the horn and the anvil together with the bag in between. The method further includes the step of delivering ultrasonic vibrations to the bag via at least one of the anvil and the horn to create a closure seal in the bag. The closure seal of the resulting bag includes a first seal created by the first bead and at least one second seal created by the at least one second bead, the first seal having a weld depth greater than a weld depth of the at least one second seal. In some embodiments, the closure seal is made up of a plurality of layers of a film, wherein the first seal welds all of the plurality of layers and the second seals welds less than all of the plurality of layers.

Although the invention has been described with reference to a particular arrangement of parts, features and the like, these are not intended to exhaust all possible arrangements or features, and indeed many modifications and variations will be ascertainable to those of skill in the art.

What is claimed is:

1. An ultrasonic sealing tool, comprising:
   an anvil including a sealing surface;
   a horn including a sealing surface facing the sealing surface of the anvil;
   the sealing surface of said anvil including a plurality of beads including a first bead having a first height and at least one second bead having a second height, the second height being less than the first height;
   the ultrasonic sealing tool delivering ultrasonic vibrations via at least one of said anvil and said horn to create a closure seal in a work piece positioned between said anvil and said horn, the closure seal including a first seal created by the first bead and at least one second seal created by the at least one second bead, the first seal having a weld depth greater than a weld depth of the at least one second seal;
   wherein the work piece is a gusseted bag including an end defined by the closure seal and a product-containing portion, wherein the at least one second seal is positioned between the first seal and the product-containing portion of the gusseted bag; and
   wherein the closure seal comprises a plurality of layers of a film, wherein the first seal welds all of the plurality of layers and the at least one second seal does not weld all of the plurality of layers.

2. The tool according to claim 1, wherein the first seal is adjacent to a distal edge of the end of the gusseted bag.

3. The tool according to claim 1, wherein the gusseted bag is comprised of a film with two or more layers of the film in the end of the gusseted bag.

4. The tool according to claim 1, wherein:
   the work piece is two bags;
   the sealing surface of said anvil includes a third bead having the first height and at least one fourth bead having the second height; and
   the ultrasonic sealing tool delivers ultrasonic vibrations via at least one of said anvil and said horn to create a closure seal in each of the two bags, the closure seal in a first one of the bags including the first seal created by the first bead and the at least one second seal created by the at least one second bead, the closure seal in a second one of the bags including a third seal created by the third bead and at least one fourth seal created by the at least one fourth bead, the third seal having a weld depth greater than a weld depth of the at least one fourth seal.

5. The tool according to claim 4, wherein the at least one second seal is positioned between the first seal and a product-containing portion of the first one of the bags, and the at least one fourth seal is positioned between the third seal and a product-containing portion of the second one of the bags.

6. The tool according to claim 1, wherein the work piece is a pouch having a side defined by the closure seal, a product-containing portion, and a top end including an integrated zipper extending through the closure seal, wherein the at least one second seal is positioned between the first seal and the product-containing portion of the pouch.

7. The tool according to claim 1, wherein the sealing surface of said horn is flat.

8. The tool according to claim 1, wherein the sealing surface of said anvil further includes a curved recess in between each of the plurality of beads such that the sealing surface has a wavy pattern, wherein the sealing surface of said horn has a corresponding wavy pattern.

9. An ultrasonic sealing tool, comprising:
   an anvil including a sealing surface;
   a horn including a sealing surface facing the sealing surface of the anvil;
   the sealing surface of said anvil including a plurality of beads including a first bead having a first height and at least one second bead having a second height, the second height being less than the first height;
   the ultrasonic sealing tool delivering ultrasonic vibrations via at least one of said anvil and said horn to create a closure seal in a work piece positioned between said anvil and said horn, the closure seal including a first seal created by the first bead and at least one second seal created by the at least one second bead, the first seal having a weld depth greater than a weld depth of the at least one second seal;
   wherein the sealing surface of said anvil further includes a curved recess in between each of the plurality of beads such that the sealing surface has a wavy pattern, wherein the sealing surface of said horn has a corresponding wavy pattern; and
   wherein the sealing surfaces of said anvil and said horn progressively diverge from one other from a first side of the tool to a second side of the tool, such that the wavy pattern defines the first and second beads which create the first and second seals having different weld depths.

10. The tool according to claim 1, wherein the sealing surfaces of said anvil and said horn are horizontally opposed to one another.

11. The tool according to claim 1, further comprising:
    a power supply;
    a converter connected to one of said anvil or said horn converting electrical impulses from said power supply into mechanical vibrations at ultrasonic frequencies.

12. An ultrasonic sealing system for gusseted or zippered bags, comprising:
    an ultrasonic tool including an anvil having upper and lower sealing surfaces and a horn having upper and lower sealing surfaces facing the upper and the lower sealing surfaces of the anvil;
    each of the upper and the lower sealing surfaces of said anvil include a plurality of beads including a first bead having a first height and at least one second bead having a second height, the second height being less than the first height;
    the ultrasonic sealing system delivering ultrasonic vibrations via at least one of said anvil and said horn to simultaneously create closure seals in each of two bags positioned between the anvil and the horn, each of the closure seals including a first seal created by the first bead and at least one second seal created by the at least one second bead, the first seal having a weld depth greater than a weld depth of the at least one second seal;

a cutting tool extendible between the upper and lower sealing surfaces of at least one of said anvil and said horn to sever the two bags; and wherein each of the closure seals comprises a plurality of layers of a film, wherein the first seal welds all of the plurality of layers and the at least one second seal does not weld all of the plurality of layers.

13. The system according to claim 12, wherein each of the bags is comprised of a film with two or more layers of the film in a sealed portion of the bag.

14. The system according to claim 12, wherein each of the closure seals comprises a plurality of layers of a film and an end of a zipper at least partially crushed by the ultrasonic tool.

15. The system according to claim 12, wherein each of the upper and lower sealing surfaces of the anvil further include a curved recess in between each of the plurality of beads such that the upper and lower sealing surfaces of the anvil have a wavy pattern, wherein the upper and lower sealing surfaces of said horn have a corresponding wavy pattern.

16. An ultrasonic sealing system for gusseted or zippered bags, comprising:
an ultrasonic tool including an anvil having upper and lower sealing surfaces and a horn having upper and lower sealing surfaces facing the upper and the lower sealing surfaces of the anvil;
each of the upper and the lower sealing surfaces of said anvil include a plurality of beads including a first bead having a first height and at least one second bead having a second height, the second height being less than the first height;
the ultrasonic sealing system delivering ultrasonic vibrations via at least one of said anvil and said horn to simultaneously create closure seals in each of two bags positioned between the anvil and the horn, each of the closure seals including a first seal created by the first bead and at least one second seal created by the at least one second bead, the first seal having a weld depth greater than a weld depth of the at least one second seal;
a cutting tool extendible between the upper and lower sealing surfaces of at least one of said anvil and said horn to sever the two bags;
wherein each of the upper and lower sealing surfaces of the anvil further include a curved recess in between each of the plurality of beads such that the upper and lower sealing surfaces of the anvil have a wavy pattern, wherein the upper and lower sealing surfaces of said horn have a corresponding wavy pattern; and wherein the sealing surfaces of said anvil and said horn progressively diverge from one other from a first side of the tool to a second side of the tool, such that the wavy pattern defines the first and second beads which create the first and second seals having different weld depths.

17. The system according to claim 15, further comprising:
a power supply;
a converter connected to one of the anvil or the horn converting electrical impulses from said power supply into mechanical vibrations at ultrasonic frequencies.

18. A method for sealing a gusseted or zippered bag, comprising the steps of:
positioning a bag between a sealing surface of an anvil and a sealing surface of a horn, the sealing surface of the anvil including a first bead having a first height and at least one second bead having a second height, the second height being less than the first height;
delivering ultrasonic vibrations to the bag via at least one of the anvil and the horn to create a closure seal in the bag, the closure seal including a first seal created by the first bead and at least one second seal created by the at least one second bead, the first seal having a weld depth greater than a weld depth of the at least one second seal; and
wherein the closure seal comprises a plurality of layers of a film, wherein the creating the closure seal includes creating the first seal by welding all of the plurality of layers and creating the at least one second seal by welding less than all of the plurality of layers.

19. A method according to claim 18, wherein the bag is a gusseted bag includes an end defined by the closure seal and a product-containing portion, wherein the at least one second seal is positioned between the first seal and the product-containing portion of the gusseted bag.

20. The method according to claim 18, wherein the bag includes a side defined by the closure seal, a product-containing portion, and a top end including an integrated zipper extending through the closure seal, wherein the at least one second seal is positioned between the first seal and the product-containing portion of the bag.

21. A method according to claim 18, comprising the steps of actuating a cutting tool to sever the bag from a second bag.

* * * * *